US008781906B2

(12) United States Patent
Cruttenden et al.

(10) Patent No.: US 8,781,906 B2
(45) Date of Patent: Jul. 15, 2014

(54) SYSTEMS AND METHODS FOR MANAGING CONSUMER TRANSACTION-BASED INVESTMENTS

(76) Inventors: Walter Cruttenden, Corona del Mar, CA (US); Jeffrey Cruttenden, Newport Beach, CA (US); Jason Martell, Irvine, CA (US)

(*) Notice: Subject to any disclaimer, the term of this patent is extended or adjusted under 35 U.S.C. 154(b) by 0 days.

(21) Appl. No.: 13/366,499

(22) Filed: Feb. 6, 2012

(65) Prior Publication Data
US 2013/0204726 A1 Aug. 8, 2013

(51) Int. Cl.
*G06G 1/12* (2006.01)
*G06Q 20/00* (2012.01)
*H04M 1/24* (2006.01)

(52) U.S. Cl.
USPC .................................. 705/21; 705/16; 379/35

(58) Field of Classification Search
USPC ........................................ 705/21, 16; 379/35
See application file for complete search history.

(56) References Cited

U.S. PATENT DOCUMENTS

| 6,070,153 A * | 5/2000 | Simpson .................... 705/36 R |
| 6,112,191 A * | 8/2000 | Burke ............................ 705/41 |
| 6,164,533 A * | 12/2000 | Barton ......................... 235/380 |
| 6,941,279 B1 * | 9/2005 | Sullivan ......................... 705/35 |
| 7,831,494 B2 * | 11/2010 | Sloan et al. ................. 705/36 R |
| 8,255,329 B1 * | 8/2012 | Barth et al. ..................... 705/43 |
| 8,301,530 B2 * | 10/2012 | Carretta et al. ................ 705/35 |
| 8,416,924 B1 * | 4/2013 | Barth et al. ..................... 379/35 |
| 2002/0123954 A1 * | 9/2002 | Hito ............................. 705/36 |
| 2003/0093353 A1 * | 5/2003 | Ward et al. .................... 705/36 |
| 2003/0149629 A1 * | 8/2003 | Claridge et al. ............... 705/17 |
| 2003/0225649 A1 * | 12/2003 | Simpson ....................... 705/35 |
| 2004/0222285 A1 * | 11/2004 | Pohl ............................ 235/379 |
| 2004/0243498 A1 * | 12/2004 | Duke ............................ 705/35 |
| 2006/0036523 A1 * | 2/2006 | Stover et al. ................... 705/35 |
| 2006/0047589 A1 * | 3/2006 | Grau ............................ 705/35 |
| 2007/0011089 A1 * | 1/2007 | DeSchryver .................. 705/39 |
| 2007/0094130 A1 * | 4/2007 | Burke ........................... 705/39 |
| 2008/0065532 A1 * | 3/2008 | De La Motte ................. 705/39 |
| 2008/0255951 A1 * | 10/2008 | Miller et al. ................... 705/14 |
| 2009/0089104 A1 * | 4/2009 | Kondaks ......................... 705/4 |
| 2009/0150286 A1 * | 6/2009 | Barton .......................... 705/44 |
| 2009/0204503 A1 * | 8/2009 | Hursta .......................... 705/16 |
| 2010/0005034 A1 * | 1/2010 | Carpenter et al. .......... 705/36 R |
| 2010/0005035 A1 * | 1/2010 | Carpenter et al. .......... 705/36 R |
| 2010/0121723 A1 * | 5/2010 | Miller et al. .................. 705/16 |
| 2011/0125637 A1 * | 5/2011 | Kalra et al. ................... 705/40 |
| 2011/0307318 A1 * | 12/2011 | LaPorte et al. ............. 705/14.33 |
| 2012/0123849 A1 * | 5/2012 | Armstrong ................ 705/14.33 |
| 2012/0173454 A1 * | 7/2012 | Shah et al. ................. 705/36 R |
| 2012/0233089 A1 * | 9/2012 | Calman et al. ............. 705/36 R |
| 2012/0233090 A1 * | 9/2012 | Tavares et al. ............. 705/36 R |
| 2013/0138577 A1 * | 5/2013 | Sisk ............................ 705/36 R |

* cited by examiner

*Primary Examiner* — Ramsey Refai
*Assistant Examiner* — Ashford S Hayles
(74) *Attorney, Agent, or Firm* — Sandra P. Thompson; Buchalter Nemer

(57) ABSTRACT

The field of the invention relates to systems and methods for controlling investment funds, and more particularly to systems and methods for real-time projections based on consumer transactions. In one embodiment, an investment fund management system may include a consumer communication device configured to create a payment gateway with a Point of Sales (POS) terminal. The system further includes a portfolio server accessible over a data network. The consumer communication device is configured to execute a process including the steps of intercepting a transaction through the payment gateway; computing an expected return based on the investment of a transaction amount from said transaction; and providing the expected return to the consumer communication device.

17 Claims, 7 Drawing Sheets

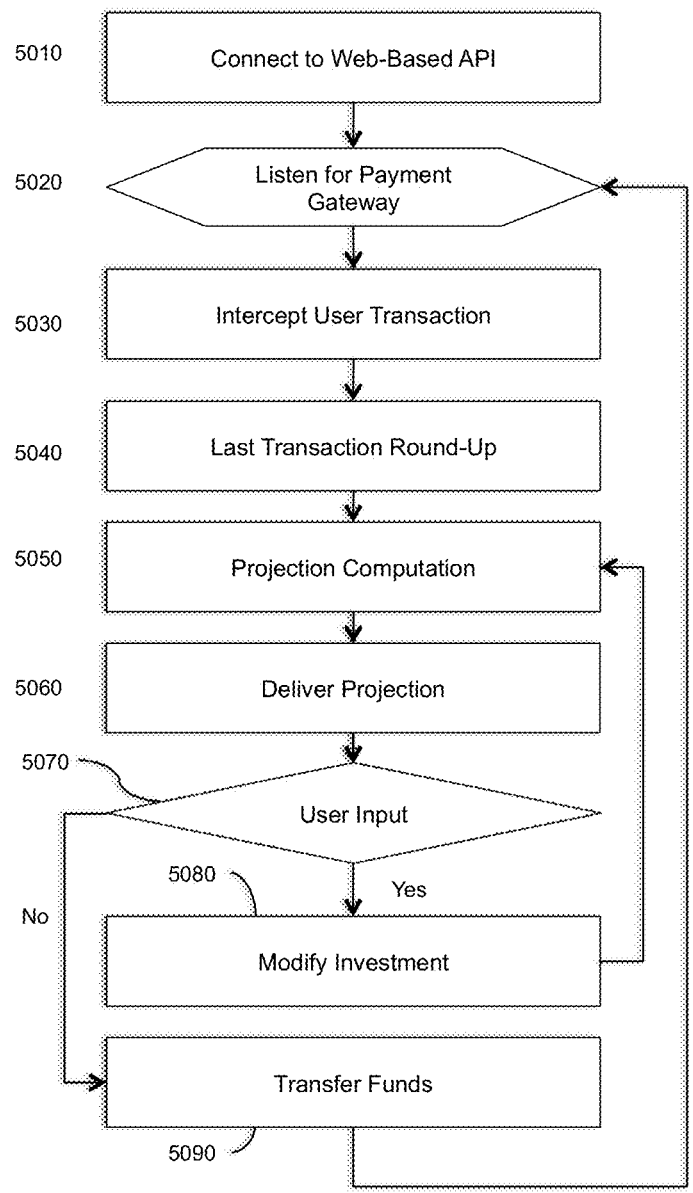

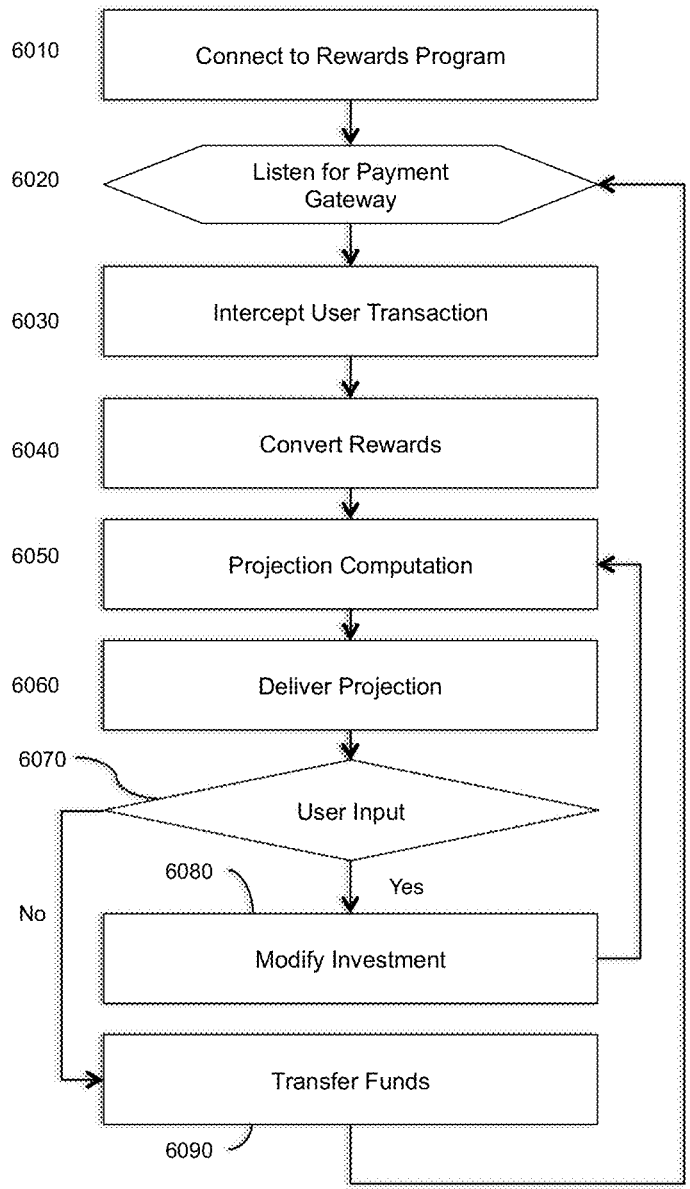

SYSTEMS AND METHODS FOR MANAGING CONSUMER TRANSACTION-BASED INVESTMENTS

FIELD OF THE INVENTION

The field of the invention relates to systems and methods for controlling investment funds, and more particularly to systems and methods for real-time investment data projections based on traditional consumer transactions, such as through Near Field Communications (NFC).

BACKGROUND OF THE INVENTION

A variety of financial investment programs exist to facilitate protecting consumer assets. Among these programs, long-term investment plans allow consumers/employees to save for their future/retirement within an expected period of time.

For example, a pension plan is an income arrangement that provides consumers deferred compensation following retirement. Pension plans typically are employment-based and may be classified as defined benefits, defined contributions, or a combination of both. Defined benefit plans involve the promise of an employer for a specific payout at retirement based on the employee's salary and length of membership in the plan (e.g., Individual Retirement Accounts (IRAs) and 401(k) plans where pre-defined investments are allocated from the employee's income). Similarly, with defined contribution plans, employers and/or employees contribute funds during employment; however, the payout at retirement is based on the performance of the investment and the amount of compensation is uncertain. Hybrid plan designs combine features of defined benefits as well as defined contributions (e.g., cash balance plans).

When used correctly, these programs not only promote economic growth but also personal financial safety. Investing resources provides fixed capital (e.g., land, buildings, equipment) for the economy and potential gain for the investor. The most effective long-term investments bear low risks and offer high profits. These investments minimize the effect of market fluctuations and other risks to maximize the expected return.

As those of ordinary skill in the art would appreciate, methods for reducing investment risk include, but are not limited to, diversification and hedging. Investing in a variety of assets to diversify investments creates less risk than the weighted average risk of its constituent assets. Modern portfolio theory (MPT) mathematically formulates the concept of diversification in investing to reduce the total variance of a portfolio return. Alternatively, hedging involves investments in one market to offset and balance potential losses/risks incurred by assuming an opposing position. Methods for risk-averse investments are well understood and appreciated.

Unfortunately, despite the potential reward of investing and risk-aversion techniques, many employees fail to establish any long-term investment plan at all. In some cases, these investment programs are not always available to a large portion of the population. Even where available, many employees/consumers lack the motivation to invest over a long period of time because it is difficult to visualize a high-expected return without sufficient investment expertise. Accordingly, transactions costs (e.g., fees, commission, and so on) are high and employees/consumers often are unwilling to accept the risk of investment for an unknown reward.

Related to investment programs, some employees/consumers choose savings to preserve their income. Savings are defined as income not spent (i.e., deferred consumption) such as, for example, money put aside in a bank. This also includes reducing expenses. Savings are relatively accessible to a larger group of users than most investments. A deposit account paying interest is often used to hold money for future needs. Typically, conventional saving methods earn low, fixed rates and present correspondingly lower risks than investments. It is possible to invest resources not spent as previously discussed; however, increased saving does not always correspond to increased investment. Nevertheless, consumers must still rely on self-discipline to save.

One method for encouraging financial asset protection influences users during the consumer transaction process. For example, a current approach allows consumers to save and/or donate a portion of a credit or debit transaction. An example is disclosed in U.S. Pat. No. 6,112,191, to Burke, filed Apr. 27, 1995, for a "Method and System to Create and Distribute Excess Funds from Consumer Spending Transactions," which is hereby incorporated by reference in its entirety. The system rounds up any credit or debit transaction to the nearest dollar and allows the consumer to save the difference between the actual transaction price and the rounded amount in a surplus account. This approach creates excess funds from spending transactions and provides an immediate opportunity to set aside these assets at the point of sale, thereby reducing transaction costs to save.

Although these systems are effective for creating opportunities to defer assets, the consumer still must actively choose to allocate the excess funds into a surplus account. Furthermore, current approaches only set aside the excess funds for future consumption (i.e., saved) rather than investing in hopes of realizing higher long-term returns. As discussed above, saving specifies a lower-risk preservation of money with a generally lower return than investments (e.g., a savings account offering a 3 percent interest rate may only grow at 1 percent annually based on a 2 percent inflation rate). In return for a commitment to place an investment for a fixed period of time, long-term investments can offer a higher yield to encourage consumers to protect their assets. Compared to shorter-term savings or investments that may respond quickly to market fluctuations, investing a portion of savings over the long-term can return enough to outpace inflation. These lower rates are often insufficient to motivate an experienced consumer to actively allocate excess funds into a surplus account.

Current systems assume consumers possess adequate financial knowledge to realize the expected return from preserving assets. However, an inexperienced investor may not visualize an immediate benefit of saving. Techniques that allow a consumer to save excess funds during a consumer transaction rarely provides the consumer with potential investment benefits in real-time. Without immediate knowledge, the opportunity to save may not overcome a pre-conceived reluctance to defer consumer finance. A lack of motivation to reduce consumption continues to deter many users from protecting their assets, even prior to considering investment options. Accordingly, an improved system and method for creating a nexus between savings/investments and consumer transactions through real-time investment projections is desirable.

SUMMARY OF THE INVENTION

The field of the invention relates to systems and methods for controlling investment funds, and more particularly to systems and methods for real-time projections based on traditional consumer transactions. In one embodiment, an investment fund management system may include a Point of Sales (POS) terminal for consumer transactions. The system further includes a consumer communication device configured to create an electronic payment gateway with the POS terminal during a consumer transaction. The system also includes a portfolio server to which the consumer communication device connects over a data network. The consumer communication device is operatively coupled to a computer program product, the computer program product having a computer-usable medium including a sequence of instructions which, when executed by a processor, causes said processor to execute a process that creates investment projections based on a transaction between the POS terminal and consumer communication device.

The process includes the steps of intercepting a transaction having a first numerical amount to be transferred through the payment gateway; determining a second transaction amount in excess of the first numerical amount; determining a third transaction amount, wherein the third transaction amount is the difference between the first and second amount; computing an expected return, wherein the return is based on the investment of the third transaction amount; electronically publishing the expected return to the consumer communication device. In an alternative embodiment, the process further includes the step of transferring the third transaction amount to the portfolio server over said data network.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 5a is another flowchart of a process in accordance with an alternative embodiment of the present invention;

FIG. 6 is another flowchart of a process in accordance with an alternative embodiment of the present invention.

DETAILED DESCRIPTION OF THE PREFERRED EMBODIMENTS

Figure 1:
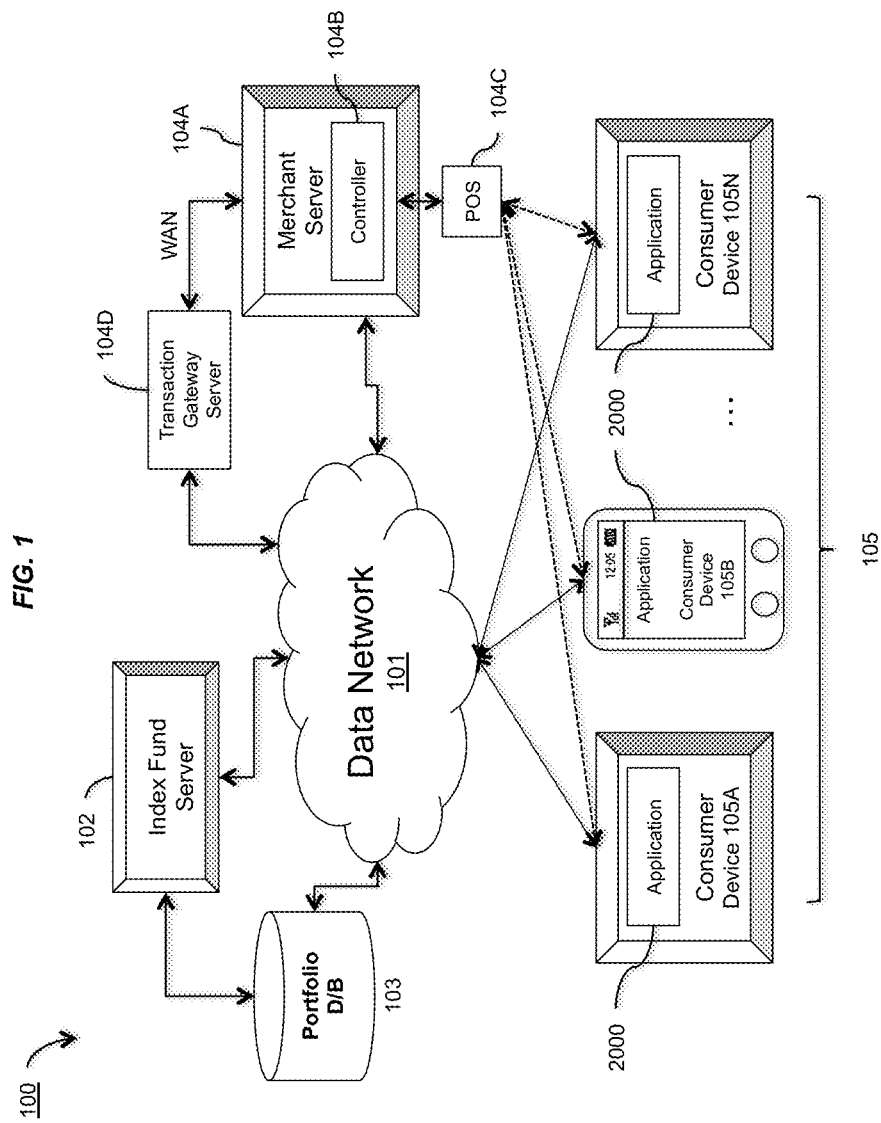
FIG. 1 is a schematic diagram of a network environment in accordance with a preferred embodiment of the present invention.

As described above, effectively protecting consumer assets typically involves an appreciation of the risks/rewards associated with establishing investments. Turning to FIG. 1, an exemplary system 100 that pushes real-time investment data to a user during consumer transactions is further illustrated in block-diagram form. The system 100 includes a merchant server 104A communicatively linked—such as through a Wide Area Network (WAN)—to a transaction gateway server 104D. It should also be understood that merchant server 104A and transaction gateway server 104D could reside on the same computing device or on different computing devices. The merchant server 104A further includes a controller 104B monitoring a point of sale (POS) input terminal 104C. POS terminal 104C is configured to support both contactless (e.g., radio) and direct (e.g., electrical conduction) transactions/data exchange including, for example, near field communication (NFC) device readers, credit/debit card readers, smart card readers, radio frequency identification (RFID) tag readers, and so on.

During a typical consumer transaction, merchants exchange goods or services for payment from a consumer. Online account-based systems—such as those available from PayPal and Google—allow consumers to securely transfer electronic payments from numerous financial accounts. In one embodiment, consumers 105 transmit electronic payment information using consumer devices 105A, 105B, and 105N, each having a processor and storage medium (not shown). Devices 105A, 105B, and 105N are preferably portable communication devices supporting NFC transmission. Examples include mobile phones, laptop computers, personal digital assistants (PDA), and portable multimedia players. However, devices 105A, 105B, and 105N also include laptops, desktops, multiprocessor systems, microprocessor-based systems, programmable consumer electronics, telephony systems, distributed computing environments, set top boxes, and so on. Devices 105A, 105B, and 105N may further include a user interface console, such as a touch screen monitor (not shown), to allow the user/consumer to preset various system parameters. User defined system parameters may include, but are not limited to, investment metrics, payment information, investment variables, and external application accessibility.

Consumers 105 touch, or bring into close proximity (e.g., usually a few centimeters), their consumer device to POS terminal 104C to make purchases. This triggers an NFC communication with an application in the consumer device through an NFC antenna, represented as dotted lines in FIG. 1. Controller 104B receives the input from the POS terminal 104B and transmits the payment information to transaction gateway server 104D, thereby creating an electronic payment gateway. As those of ordinary skill in the art would appreciate, payment gateways are application service providers to process and authorize the payment information.

In an alternative embodiment, payment information can be similarly transmitted over data network 101 through respective network connections, represented as solid lines in FIG. 1. These network connections are wired or wireless and are implemented using any known protocol. Similarly, data network 105 may be any one of a global data network (e.g., the Internet), a regional data network, or a local area network. The network 105 may use common high-level protocols, such as TCP/IP and may comprise multiple networks of differing protocols connected through appropriate gateways. Payment gateways are created upon transmission of payment information from consumer devices 105A, 105B, and 105N to merchant server 104A over data network 101, for example, via the Internet.

System 100 further includes an Index Fund Server 102 controlling access to a portfolio database 103. Portfolio database 103 stores electronic files representing financial investment fund account information of consumers 105, including both individual and collective investment funds. In one embodiment, portfolio database 103 represents a collective investment scheme, such as storing various index funds. As an example of a collective investment scheme, Index Funds Advisors (IFA) offer 100 Index Portfolios, which are individualized and indexed funds to replicate the movement of an index of a specific financial market. Alternatively, portfolio database 103 may represent other investment schemes, such as, social conscious funds, exchange-traded funds (ETF), mutual funds, fund of funds (FOF), pre-constructed portfolios, and so on. User input from consumers 105 may also specify a particular scheme for storage. The information from database 103 can be accessed over data network 101 through similar network connections discussed above. As one of ordinary skill in the art would appreciate, portfolio database 103 may be any type of storage device or storage medium such as hard disks, cloud storage, CD-ROMs, flash memory, DRAM and may also include a collection of devices (e.g., Redundant Array of Independent Disks ("RAID")). Similarly, it should be understood that Index Fund Server 102 and portfolio database 103 could reside on the same computing device or on different computing devices.

As previously mentioned, for consumer transaction systems 100 that allow consumers 105 to save and/or donate a portion of a credit or debit transaction, consumers 105 are given an option to submit a payment in excess of the amount required from merchant server 104A. Additional funds are then transferred to a surplus account. An immediate opportunity to set aside current funds is provided without actionable knowledge regarding the application of the excess funds. As a result, consumers 105 may not have an effective gauge of the potential earned value from investing excess funds. Therefore, the immediate opportunity to save during consumer transactions is often declined and can negatively affect retirement goals.

Figure 2:
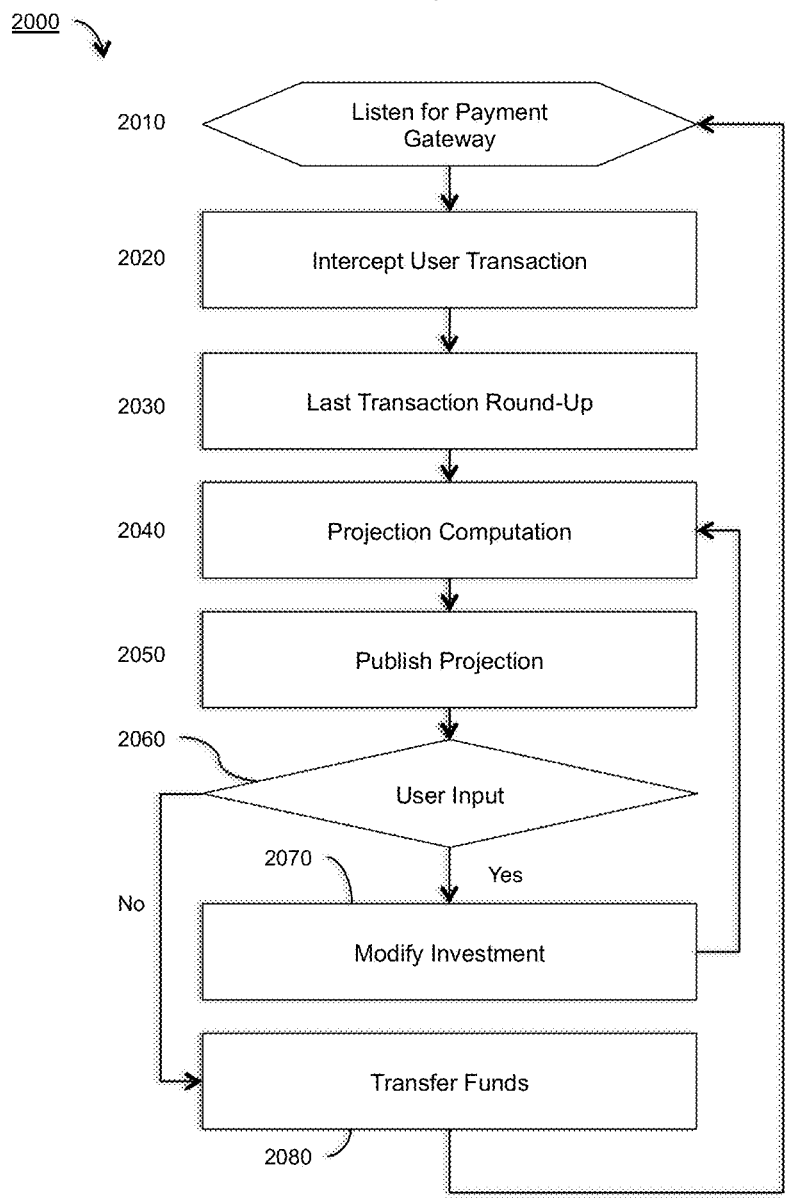
FIG. 2 is a flowchart of a process in accordance with a preferred embodiment of the present invention.

One approach to address this issue is illustrated in FIG. 2, which illustrates a process 2000 that may be executed within consumer devices 105A, 105B, and 105N. Process 2000 may consist of various program modules including routines, programs, objects, components, data structures, and so on that perform particular tasks or implement particular abstract data types. In a distributed computing environment, these modules are located in both local and remote storage devices including memory storage devices.

When consumers 105 make a payment/transaction from their NFC-enabled device (e.g., 105A, 105B, and 105N), as described above, an electronic payment gateway facilitates the transfer of information between the consumer device 105A, 105B, and 105N and the merchant server 104A. Process 2000 monitors any transaction done through an approved gateway (starting block 2010) and intercepts the transmitted information (action block 2020). In one embodiment, consumers 105 authorize process 2000 to intercept payment information from consumer device 105A, 105B, and 105N in real-time, prior to transmission. However, process 2000 may also periodically poll transaction gateway server 104D for recent payment transactions. Client/server-based polling in network computing environments is well understood and appreciated.

Once the payment information is intercepted, process 2000 determines the amount of payment that is to be transferred from a consumer account using consumer device 105A, 105B, or 105N. This payment amount is then rounded-up to the next dollar amount (action block 2030). For example, a consumer purchase of $10.20 will be rounded-up to $11.00. Subsequently, the difference between the actual payment price and the rounded price (e.g., $0.80 using the previous example) is eligible for electronic transfer into an investment fund.

As illustrated in FIG. 2, prior to providing the consumer with an option to set aside this difference amount, action block 2040 immediately computes a projected return of a long-term investment of the difference amount (e.g., a 50-year investment). In one embodiment, this computation is based on the historical performance of portfolios designed according to Modern Portfolio Theory (MPT). For example, the predicted return may reflect the relative return of similar investments based on composite stock market indices of like companies/sectors (e.g., indices for companies of a certain size, management, and so on). However, mean reversion or the standard deviation on the rate of return of similar investments may also be used to measure the volatility of the investment. Consumers 105 may also select related Return on Investment (ROI) metrics to compute a projected return.

Figure 3:
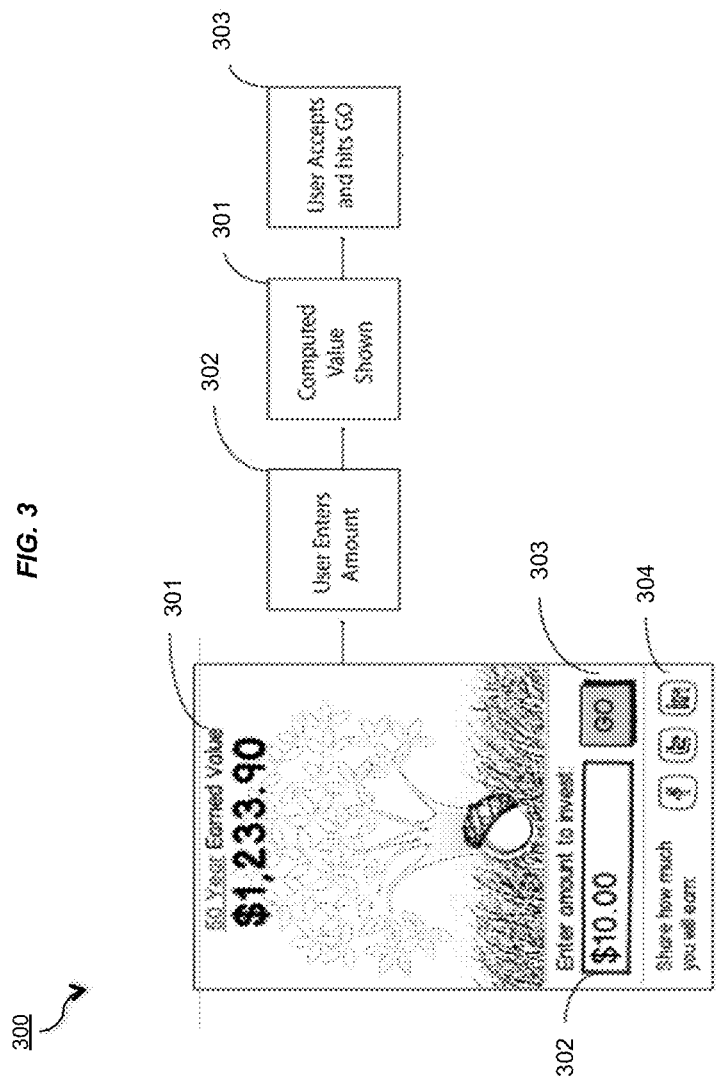
FIG. 3 is a functional block diagram of a published computation delivered to a consumer device.

After a projected return is obtained, this information is immediately published to consumer device 105A, 105B, or 105N, e.g., using server push or comparable publish/subscribe-based data network communication (action block 2050). With reference to FIG. 3, a sample screenshot publication 300 is illustrated in block diagram form. The instant computed value obtained in action block 2040 is displayed as a possible earned value 301. In this example, earned value 301 is a projected value of the investment 302 (i.e., a 50-year investment of $10.00). Social networking options 304 allow consumers 105 to publish their earned value 301 on one or more social media platforms (e.g., Facebook®, Twitter®, LinkedIn®, MySpace®). Providing earned value 301 involves consumers 105 in the application of their possible savings. Through projected effects of investment, consumers 105 have an immediate gauge of personal savings goals to make speedy, and educated, decisions for allocating assets during a consumer transaction.

Turning back to FIG. 2, educated consumers 105 subsequently have the option to alter the amount to invest (decision block 2060). If a consumer customizes their investment to meet their specific financial goals (i.e., increase or decrease the difference between the transaction price and the rounded-up value), the investment value 302 is modified for transfer (action block 2070). As illustrated in FIG. 3, investment 302 is configured to receive consumer 105 input. Earned value 301 is dynamically updated to reflect the manual entry to investment 302 (return to action block 2040).

If the consumer 105 accepts—for example, clicking submit box 303 in FIG. 3, the funds indicated in investment 302 are transferred to an index fund (action block 2080). Specifically, consumer device 105A, 105B, or 105N transfers payment information to Index Fund Server 102 over data network 101. The electronic funds are updated in the consumers respective account maintained in portfolio database 103. Accordingly, process 2000 provides the advantages of reducing transactions costs for investing a few cents a time and providing the expected future value of the investment, all during a payment/transaction from a consumer device. Process 2000 returns to action block 2010 to monitor and intercept the next consumer transaction.

Figure 4:
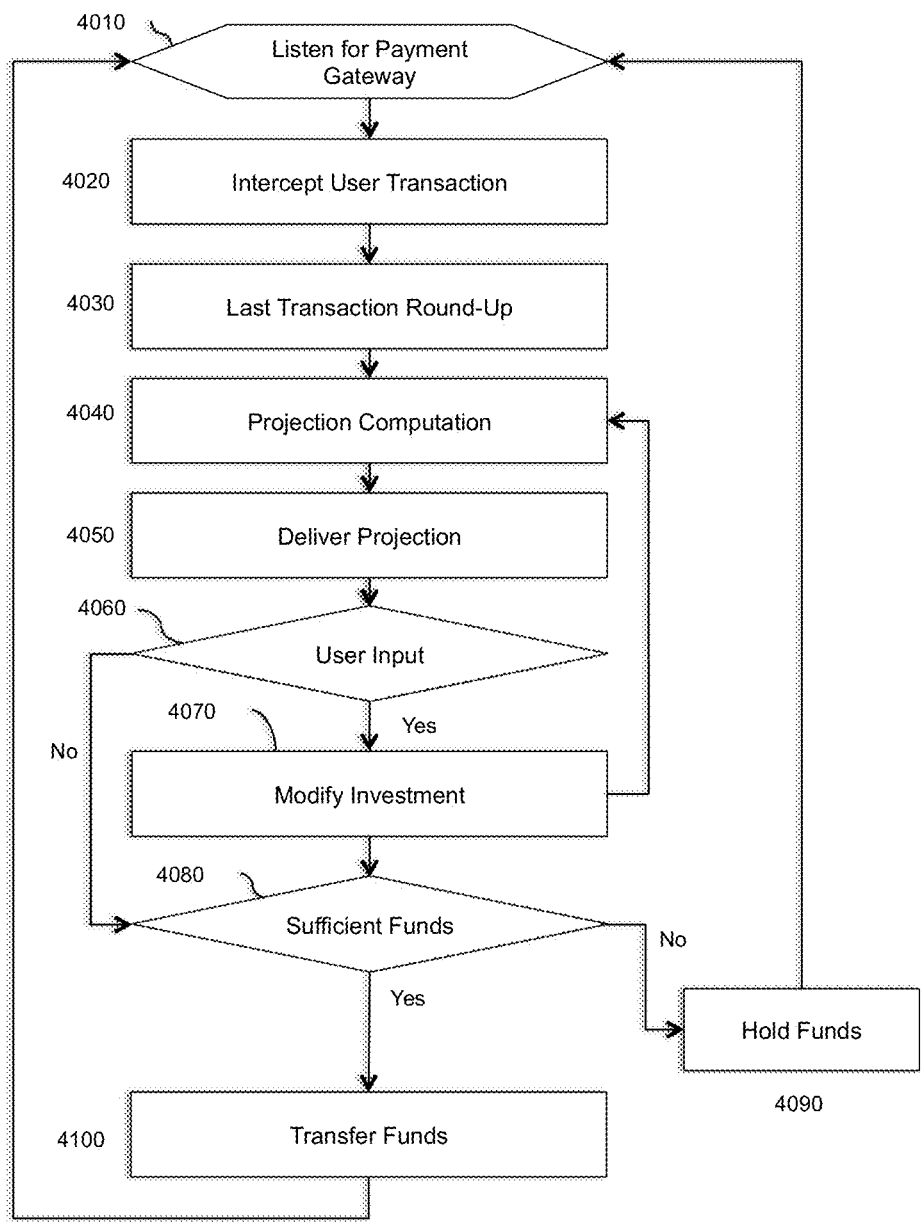
FIG. 4 is another flowchart of a process in accordance with an alternative embodiment of the present invention.

Turning to FIG. 4, another process 4000 that pushes real-time investment data to a user during consumer transactions is further illustrated in block-diagram form. Like with process 2000, process 4000 monitors any transaction done through an approved gateway (starting block 4010) and intercepts the transmitted information (action block 4020). The amount of payment that is to be transferred from consumer device 105A, 105B, or 105N is rounded-up to the next dollar amount (action block 4030). The difference between the actual payment price and the rounded amount is eligible for electronic transfer into an investment fund. Prior to providing consumers with an option to set aside this amount, process 4000 immediately computes a projected return of a long-term investment of the difference amount (e.g., a 50-year investment) (action block 4040), as discussed in process 2000.

This projection is immediately delivered to consumer device 105A, 105B, or 105N, e.g., using server push or comparable publish/subscribe-based data network communication (action block 4050). With this information, consumers 105 have the option to alter the amount to invest (decision block 4060). If a consumer chooses to customize their investment (i.e., increase or decrease the difference between the transaction price and the rounded-up value), the investment value is modified for transfer (action block 4070), and process 4000 computes an updated investment projection to reflect the manual entry (return to action block 4040).

Once the consumer 105 approves the investment of their assets, process 4000 determines whether sufficient funds are present before an investment is made (decision block 4080). If sufficient funds are not present, process 4000 delays any transfer of funds and electronically stores the amount, such as within consumer devices 105A, 105B, or 105N, until an aggregate amount is sufficient for investment (action block 4090). By pooling together investors' funds, certain investments—for example, investments requiring a minimum dollar amount—for greater returns can be made. Aggregating funds to minimize the number of investment purchases also reduces transaction costs. Once a sufficient amount is present for transfer—including previously held funds, consumer device 105A, 105B, and 105N transfers a single bulk payment to Index Fund Server 102 for storage in database 103 over data network 101 (action block 4100). Process 4000 returns to action block 4010 to monitor and intercept the next consumer transaction over data network 101. Accordingly, process 4000 provides the advantage of further reducing transaction costs for greater returns.

Figure 5B:
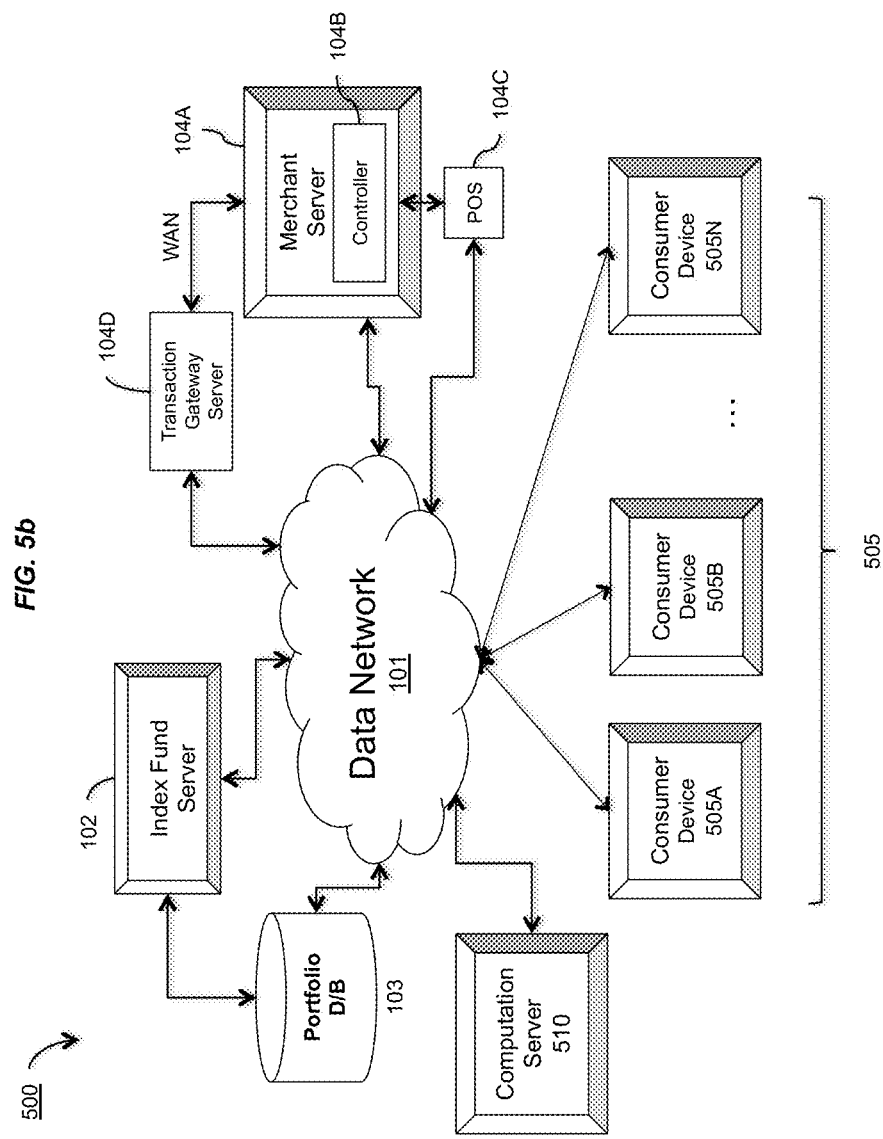
FIG. 5b is another schematic block diagram of a network environment executing a process in accordance with an alternative embodiment of the present invention.

Turning to FIG. 5a, another process 5000 that pushes real-time investment data to a user during consumer transactions is further illustrated in block-diagram form. This process is based on network system 500 having consumer devices 505 without NFC antennas, as shown in FIG. 5b. In system 500, a computation server 510 is connected to data network 101 through respective network connections as previously discussed. Computation server 510 preferably includes a web-based operating system and a processor (not shown) for hosting web pages and executing web-based applications, such as process 5000. Transaction gateway server 104D further includes an application program interface ("API") having a set of components, routines, protocols and tools for communicating with various applications (e.g., process 2000 and 5000). The API includes specifications for routines, data structures, object classes, and variables. Such interfaces are generally well known.

Turning back to FIG. 5a, computation server 510 monitors existing payment gateways (e.g., from online account-based systems discussed above) through the API of gateway server 104D (start block 5010). Once a connection is established, computation server 510 proceeds to monitor consumer transactions through payment gateways over data network 101, similar to process 2000 (delay block 5020). When consumers 505 make a payment/transaction from their consumer device (e.g., 505A, 505B, and 505N), computation server 510 intercepts the transmitted information, as described above (action block 5030). The amount of payment that is to be transferred over data network 101 is rounded-up to the next dollar amount (action block 5040), where the difference between the actual payment price and the rounded amount is eligible for electronic transfer into an investment fund. Prior to providing consumers with an option to set aside this amount, computation server 510 immediately computes a projected return of a long-term investment of the difference amount (e.g., a 50-year investment), as discussed in process 2000 (action block 5050).

This projection is immediately delivered to consumer device 505A, 505B, or 505N, e.g., using server push or comparable publish/subscribe-based data network communication, over data network 101 (action block 5060). With this information, consumers 505 have the option to alter the amount to invest (decision block 5070). If a consumer chooses to customize their investment (i.e., increase or decrease the difference between the transaction price and the rounded-up value), the investment value is modified for transfer (action block 5080), and computation server 510 computes an updated investment projection to reflect the manual entry (return to action block 5050). Once the consumer 505 approves the investment of their assets, consumer device 505A, 505B, or 505N transfers payment information to Index Fund Server 102 for storage in database 103 over data network 101 (action block 5090). However, similar to process 4000, payment information may also be delayed until sufficient funds are reached (not shown). Process 5000 returns to action block 5020 to monitor and intercept the next consumer transaction over data network 101.

In yet another alternative embodiment, FIG. 6 illustrates another process 6000 for converting consumer assets for future spending. The previous embodiments are based on consumer transactions using tangible funds (i.e., cash and electronic funds). However, other accounts and assets may be used. For example, rewards points allow companies to reward customers for various purchases. Points are awarded to a customer that can be accumulated and later redeemed for merchandise, cash, and/or services. During a consumer transaction, consumers redeem rewards points, instead of cash, for goods or services from merchants. Online account-based systems—such as those available from www.points.com or other major credit card companies—allow consumers to securely transfer reward points from numerous financial accounts just like cash. In one embodiment, consumers 505 transfer points, electronically, using consumer devices 505A, 505B, and 505N. While consumers 105 can similarly transfer reward points over data network 105 or through NFC in system 100, system 500 is used in this example for illustration purposes only. Accordingly, gateway server 104D is configured to receive and authorize reward-type payments.

Turning back to FIG. 6, like with process 5000, process 6000 monitors existing payment gateways (e.g., from online account-based systems discussed above) through the API of gateway server 104D (start block 6010). This allows consumers 505 to examine transactions from their rewards-based accounts. Once a connection is established, process 6000 proceeds to monitor consumer transactions through payment gateways over data network 101, similar to process 5000 (delay block 6020). When consumers 505 submit earned reward information from their consumer device (e.g., 505A, 505B, and 505N), process 6000 intercepts the transmitted information in real-time (action block 6030). The amount of rewards that is to be transferred over data network 101 is converted to the corresponding dollar amount and rounded-up, where the difference in rewards points between the actual payment price and the rounded amount is eligible for investment, as described above (action block 6040). Process 6000 immediately computes a projected return of a long-term investment if these reward points were converted to cash and invested (e.g., a 50-year investment), as discussed in process 2000 (action block 6050).

This projection is immediately delivered to consumer device 505A, 505B, or 505N, e.g., using server push or comparable publish/subscribe-based data network communication, over data network 101 (action block 6060). With this information, consumers 505 have the option to alter the amount of earned points to convert and invest (decision block 6070). If a consumer chooses to customize their investment, the number of points is modified for transfer (action block 6080), and process 6000 computes an updated investment projection to reflect the manual entry (return to action block 6050). Once the consumer 505 approves the conversion and investment of their rewards points, consumer device 505A, 505B, or 505N transfers the rewards information to Index Fund Server 102 for storage in database 103 over data network 101 (action block 6090). However, similar to process 4000, payment information may also be delayed until sufficient funds are reached (not shown). Process 6000 then returns to action block 6020 to monitor and intercept the next consumer transaction over data network 101.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for computations based on traditional consumer transaction, such as online-based commerce; however, the invention can be used for projections in various financial systems. Additionally and obviously, features may be added or subtracted as desired. Accordingly, the invention is not to be restricted except in light of the attached claims and their equivalents.

What is claimed is:

1. An investment fund management system comprising:
    a payment gateway server;
    a Point of Sales (POS) terminal in electronic communication with the payment gateway server;
    a consumer communication device configured to create an electronic payment gateway with the POS terminal during a consumer transaction;
    a portfolio server, the portfolio server is accessible to the consumer communication device over a data network;
    wherein the consumer communication device is operatively coupled to a computer program product, the computer program product having a computer-usable medium having a sequence of instructions which, when executed by a processor, causes said processor to execute a process that creates investment projections based on a transaction between the POS terminal and consumer communication device, said process comprising:
        intercepting a transaction through the electronic payment gateway, the transaction having a first numerical amount to be transferred;
        determining a second transaction amount in excess of the first numerical amount;
        determining a third transaction amount, wherein the third transaction amount is the difference between the first and second transaction amount;
        computing an expected return, wherein the return is based on the investment of the third transaction amount; and
        electronically publishing the expected return to the consumer communication device.

2. The system of claim 1, wherein the process further includes the step of electronically transferring the third transaction amount to the portfolio server over said data network.

3. The system of claim 2, wherein the process further includes the step of aggregating said third transaction amount with additional electronic funds prior to transferring said third transaction amount.

4. The system of claim 1, wherein the consumer communication device further includes a Near Field Communication (NFC) interface.

5. The system of claim 4, wherein the POS terminal further includes a Near Field Communication (NFC) interface configured to support electronic NFC payment gateways.

6. The system of claim 1, wherein the second transaction amount is determined from rounding up the first numerical amount to the next whole dollar amount.

7. The system of claim 1, wherein the process further includes the step of publishing the expected return to a social media platform.

8. The system of claim 1, wherein computing an expected return from investing the third transaction reflects the historical performance of similar investments designed according to Modern Portfolio Theory (MPT).

9. The system of claim 1, wherein user input modifies the third transaction amount.

10. The system of claim 1, wherein portfolio server represents a collective investment scheme.

11. The system of claim 1, wherein the first transaction amount comprises a corresponding dollar amount of earned rewards points.

12. A method of creating investment projections based on a consumer transaction between a Point of Sales (POS) terminal, in electronic communication with a payment gateway server, and a consumer communication device, configured to create an electronic payment gateway with the POS terminal, wherein the consumer communication device is operatively coupled to a computer program product, the computer program product having a computer-usable medium having a sequence of instructions which, when executed by a processor, causes said processor to execute a method that creates investment projections based on a transaction between the POS terminal and consumer communication device, the method comprising:
    intercepting, by the consumer communication device processor, a transaction through the electronic payment gateway, the transaction having a first numerical amount to be transferred;
    determining, by the consumer communication device processor, a second transaction amount in excess of the first numerical amount;
    determining, by the consumer communication device processor, a third transaction amount, wherein the third transaction amount is the difference between the first and second transaction amount;
    computing, by the consumer communication device processor, an expected return, wherein the return is based on the investment of the third transaction amount; and
    electronically publishing, by the consumer communication device processor, the expected return to the consumer communication device.

13. The method of claim 12, further comprising electronically transferring said third transaction amount to a portfolio server accessible to the consumer communication device over a data network.

14. The method of claim 13, further comprising aggregating said third transaction amount with additional electronic funds prior to transferring said third transaction amount.

15. The method of claim 12, wherein the second transaction amount is determined from rounding up the first numerical amount to the next whole dollar amount.

16. The method of claim 12, wherein computing an expected return from investing the third transaction reflects the historical performance of similar investments designed according to Modern Portfolio Theory (MPT).

17. The method of claim 12, further comprising publishing the expected return to a social media platform.

\* \* \* \* \*

UNITED STATES PATENT AND TRADEMARK OFFICE
CERTIFICATE OF CORRECTION

| | |
|---|---|
| PATENT NO. | : 8,781,906 B2 |
| APPLICATION NO. | : 13/366499 |
| DATED | : July 15, 2014 |
| INVENTOR(S) | : Walter Cruttenden et al. |

Page 1 of 1

It is certified that error appears in the above-identified patent and that said Letters Patent is hereby corrected as shown below:

On the title page of the patent, item 73 at Column 1, in the section designated "Assignees", please add --Acorns Grow Incorporated, Newport Beach, California--

Signed and Sealed this
Fifteenth Day of March, 2016

Michelle K. Lee
*Director of the United States Patent and Trademark Office*